C. A. A. RAND.
POLE TRUCK FOR HARVESTERS.
APPLICATION FILED JUNE 2, 1910.
991,540.
Patented May 9, 1911.
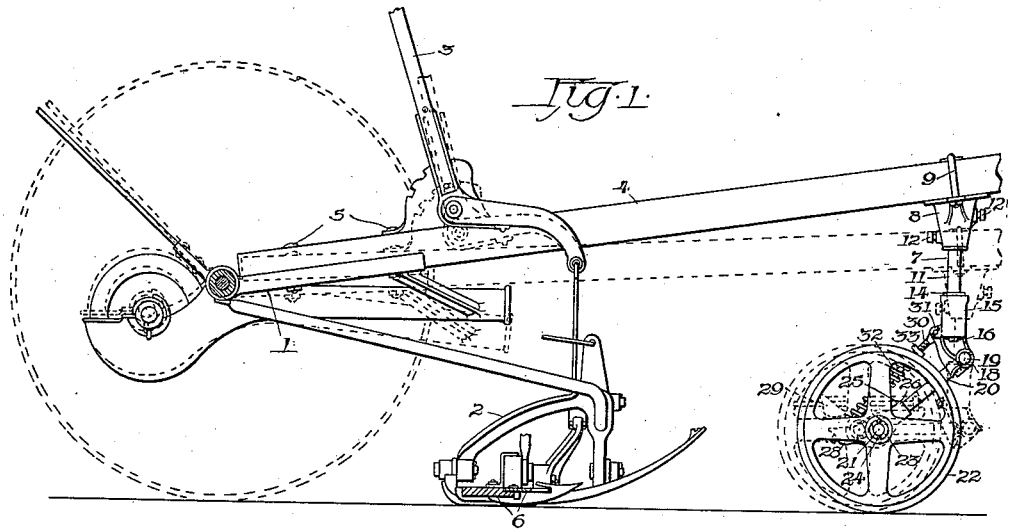
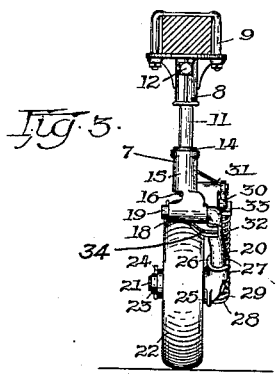
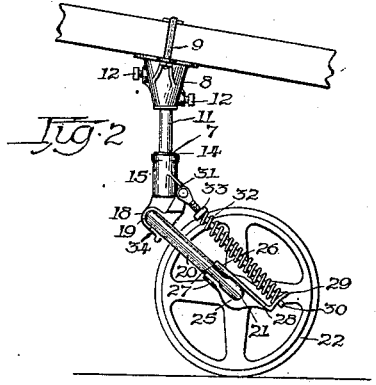
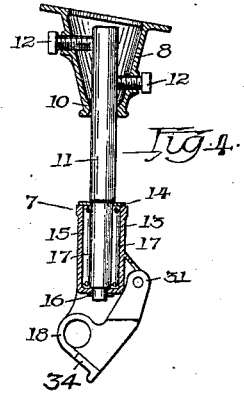
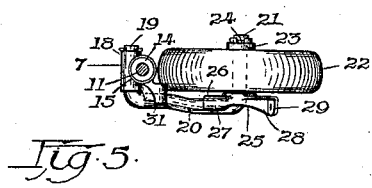
Witnesses:
F. W. Hoffmeister
H. J. Jasmer
Inventor:
Charles A. A. Rand
By E. W. Burgess
Attorney.
THE NORRIS PETERS CO., WASHINGTON, D. C.

UNITED STATES PATENT OFFICE.

CHARLES A. A. RAND, OF CHICAGO, ILLINOIS, ASSIGNOR TO INTERNATIONAL HARVESTER COMPANY, A CORPORATION OF NEW JERSEY.

POLE-TRUCK FOR HARVESTERS.

991,540.     Specification of Letters Patent.     Patented May 9, 1911.

Application filed June 2, 1910. Serial No. 564,539.

*To all whom it may concern:*

Be it known that I, CHARLES A. A. RAND, a citizen of the United States, residing at Chicago, in the county of Cook and State of Illinois, have invented certain new and useful Improvements in Pole-Trucks for Harvesters, of which the following is a specification.

My invention relates to pole trucks, and is particularly adapted for supporting the tongue of a mowing machine in a manner permitting a relative freedom of movement thereof and not impairing an efficiency of operation of the machine; its object being to provide a truck that may be readily attached to any tongue and one that will permit a free turning movement of the associated machine and a limited raising and falling movement of the tongue upon a yielding support. I attain these objects by means of the mechanism illustrated by the accompanying drawing, in which—

Figure 1 represents a side elevation of part of a mowing machine having my invention attached thereto; Fig. 2 represents a side elevation of my improved truck attached to a tongue and designed to form a part of a harvesting machine; Fig. 3 represents a front view of Fig. 2; Fig. 4 represents a vertical longitudinal section of part of Fig. 2; and Fig. 5 represents a detail of part of the truck mechanism.

The same reference numerals designate like parts throughout the several views.

1 represents the wheel frame of a mowing machine, 2 a rising and falling coupling frame coupled therewith and controlled by means of a hand lever 3 mounted upon a tongue 4 secured to the wheel frame by means of bolts 5, and 6 represents a cutting apparatus pivotally connected in a common way with the coupling frame.

7 represents my improved tongue supporting truck, including a bracket 8 that is adjustably secured to the tongue by means of a U-bolt 9 in a manner permitting the bracket to be shifted lengthwise of the tongue and secured in any desired position. The bracket is provided with a socket 10 adapted to receive the upper end of a stem 11 in a manner permitting it to be adjusted at varying angles relative to the vertical in the direction of draft of the machine, and 12 are set screws received by the walls of the socket, having their inner ends contacting with the stem, whereby it may be adjusted at an angle relative to the socket and secured therein.

13 represents a reduced portion at the lower end of the stem, and 14 a collar at the upper end of the reduced portion.

15 is a sleeve portion journaled upon the lower reduced end of the stem and secured thereto by means of a pin 16, and having roller bearings 17 intervening between the sleeve and stem, one end of the stem overlying thereon.

18 represents a sleeve portion arranged at right angles to sleeve 15, and adapted to receive a laterally projecting arm 19 at the upper end of a wheel supporting arm 20, having a laterally projecting axle member 21 at its lower end, upon which is journaled a wheel 22 that is held in place thereon by means of a washer 23 and pin 24.

25 represents a bracket having an opening to receive the axle member and a radially extending wing 26 that is provided with side flanges 27 that partially surround the arm 20 in a manner to secure the bracket thereto.

28 represents an oppositely disposed wing forming part of the bracket and having an ear portion 29 provided with an opening that slidably receives the lower end of a link 30, that has its upper end pivotally connected with an ear 31 projecting outward from the sleeve 15, the body of the link being encircled by a compression spring 32 that operates between the ear 29 and a pressure regulating nut 33 threaded upon the link in a manner to yieldingly resist the upward swing of arm 20 under the weight of its sustaining load, the movement of the arm in a downward direction being limited by a shoulder 34 on the sleeve 15.

What I claim as being my invention, and desire to secure by Letters Patent, is:

1. A tongue support including, in combination, a tongue, a depending stem secured to said tongue, a sleeve journaled upon the lower end of said stem and adapted to turn about its vertical axis, a wheel supporting arm pivotally connected with said sleeve and adapted to swing upon a transverse axis relative thereto, a wheel journaled at the outer with the outer end of said arm and with said end of said arm, and a spring connected sleeve in a manner to yieldingly resist an upward swing of said arm.

2. A tongue support including, in combination, a tongue, a depending stem secured thereto and means for adjusting said stem at varying angles relative to said tongue in the direction of the length thereof, a sleeve journaled upon the lower end of said stem and adapted to turn about its vertical axis, a wheel supporting arm pivotally connected with said sleeve and adapted to swing upon a transverse axis relative thereto, a wheel journaled at the outer end of said arm, and a spring connected with said arm and with said sleeve in a manner to yieldingly resist an upward swing of said arm.

3. A tongue support including, in combination, a tongue, a bracket adjustably secured thereto, said bracket being provided with a socket, a depending stem having its upper end adjustably received by said socket in a manner permitting its lower end to be adjusted in the direction of the length of the tongue, and means for securing it in any desired position of adjustment, a sleeve journaled upon the lower end of said stem and adapted to turn about its vertical axis, a wheel supporting arm having its inner end pivotally connected with said sleeve and adapted to turn about a transverse axis relative thereto, a wheel journaled at the outer end of said arm, and a spring connected with said arm and with said sleeve in a manner to yieldingly resist an upward swing of said arm.

4. A tongue support including, in combination, a tongue, a bracket adjustably secured thereto, said bracket being provided with a socket, a depending stem having its upper end adjustably received by said socket in a manner permitting its lower end to be adjusted in the direction of the length of the tongue, set screws threaded in the front and rear walls of said socket and contacting with said stem in a manner to hold it at various angles relative to said tongue, a sleeve journaled upon the lower end of said stem and adapted to turn about its vertical axis, a wheel supporting arm having its inner end pivotally connected with said sleeve and having a limited swinging movement about a transverse axis relative thereto, a wheel journaled at the outer end of said arm, a link pivotally connected with said sleeve and having a sliding connection with the outer end of said arm, a spring surrounding said link and operative to yieldingly resist an upward swing of said arm.

5. A tongue support including, in combination, a tongue, a bracket adjustably secured thereto, said bracket being provided with a socket, a depending stem having its upper end received by said socket, a sleeve journaled upon the lower end of said stem and adapted to turn about its vertical axis, a supplemental sleeve integral with and arranged transversely to said first mentioned sleeve, a wheel supporting arm received by said supplemental sleeve and having a limited rising and falling movement, a bracket secured to the outer end of said arm, a wheel journaled upon said arm, an ear forming part of said sleeve member, a link having one end pivotally connected with said ear and its opposite end slidably connected with the bracket secured to said arm, and a spring encircling said link and operative between said bracket and a pressure regulating nut to yieldingly resist a swinging movement of said arm in one direction.

CHARLES A. A. RAND.

Witnesses:
Jos. P. Tendell,
John M. Regan.

---

Copies of this patent may be obtained for five cents each, by addressing the "Commissioner of Patents. Washington, D. C."